Aug. 15, 1933.  R. G. JONES  1,922,371
AIRCRAFT
Filed July 17, 1930   2 Sheets-Sheet 1
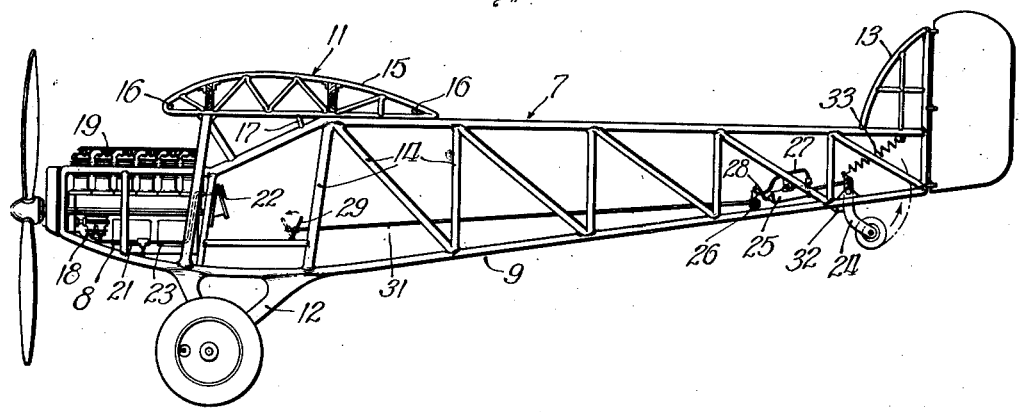
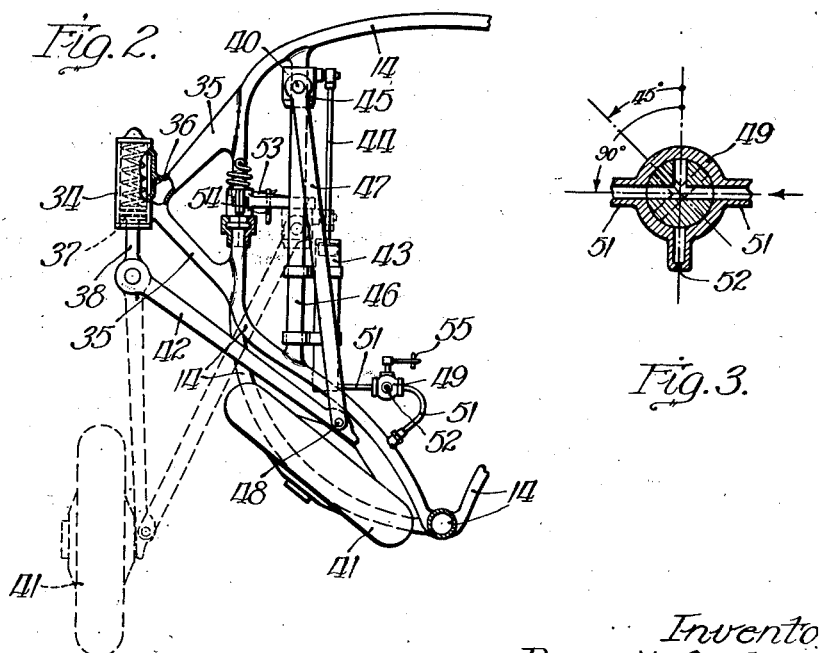
Inventor,
Russell G. Jones
By:
Brown, Jackson, Boettcher & Dienner
Attys.

Aug. 15, 1933.   R. G. JONES   1,922,371
AIRCRAFT
Filed July 17, 1930   2 Sheets-Sheet 2
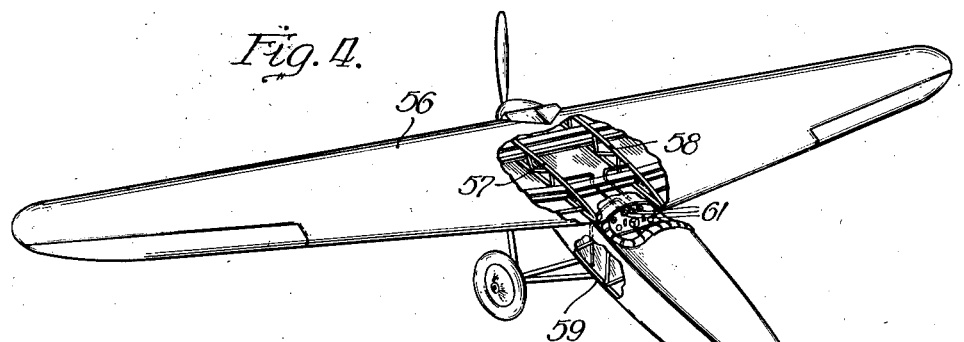
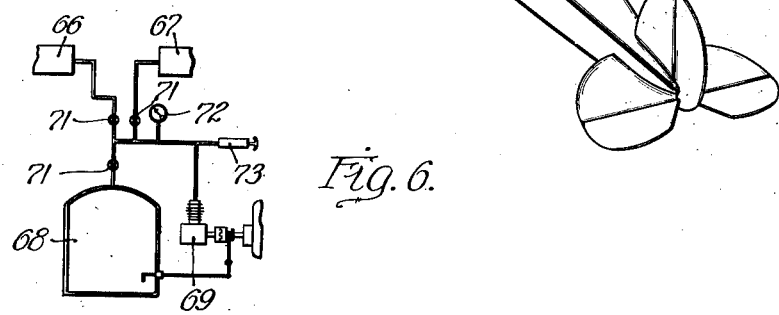
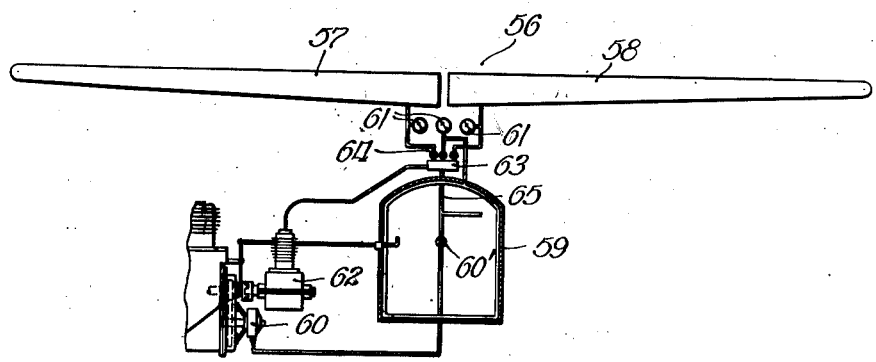
Inventor:
Russell G. Jones
By:
Brown, Jackson, Boettcher & Dienner
Attys.

Patented Aug. 15, 1933

1,922,371

UNITED STATES PATENT OFFICE 1,922,371

AIRCRAFT

Russell G. Jones, Jackson Heights, N. Y.

Application July 17, 1930. Serial No. 468,582

5 Claims. (Cl. 244—2)

The present invention relates to aircraft in general, and is more particularly concerned with aeroplanes and airships of the more modern design wherein the structural members utilized for the framework of the wings, fuselage, or hull comprise a series of metallic tubes which are welded together so as to form a unitary and rigid hollow structure. It is the present practice, even in smaller planes, to construct the entire fuselage framework of hollow steel tubing with all of the joints welded together, and it is becoming a practice in the construction of the larger planes to have one or more metallic tubes forming the main supporting structure of the wings, which practice may also be followed in constructing the wing ribs.

The main object of this invention is to utilize the steel tubes as reservoirs for storing fluids, and more particularly for compressed air or any suitable gas that may be desired. By having all of the hollow steel tubes of an aeroplane welded together so as to have their interiors interconnected, the total interior capacity of the entire tubular system would be sufficient to hold a relatively large volume of compressed air, thereby affording a potential source of energy for different uses on the plane, without requiring the additional weight of a separate air storage reservoir. It is obvious that different groups of tubing may be so sealed as to form a number of independent reservoirs, each of which may be used for a different purpose, as for storing suitable fluids therein, or for storing different bodies of compressed air in separate reservoirs, whereby one or all of these independent reservoirs will act in the capacity of a source of power for operating different mechanisms on the plane.

Another object of the invention is to provide an improved method of and apparatus for subjecting the framework of the aeroplane to a continuous test. This is effected by providing an indicating device, such as a pressure gauge on the instrument board of the plane, where it may be easily viewed by the pilot, which gauge is connected in any suitable manner with the hollow tubing structure of the plane. Planes provided with a framework of welded steel tubing, may develop various defects that will weaken the strength of the ship, and probably lead to mishap. In the course of time the tubes may crystallize, or the welded joints may likewise become crystalline and brittle, or sometimes the welded joints are weakened by burning during the welding process, and a crack is likely to result. Moreover, a defective piece of material may have been used in the construction of a plane which may break or crack when it is subjected to strain encountered in flight or on landing. Furthermore, regardless of the strength of the framework of a plane it is obvious that at sometime or another a plane may encounter a severe storm and due to the excessive strain imposed thereon, a cracked welded joint may develop, and the very same defect may develop due to shock arising from a bad landing. By having the welded steel tubing filled with air under pressure, the amount of the pressure being indicated by the pressure gauge on the instrument board, a sharp diminution of air pressure in the system of tubing will indicate to the pilot that one of the aforementioned structural failures has occurred and thereby warn him in time to prevent a more serious trouble at a later time resulting from a defect which would otherwise be unknown. Therefore, the idea of storing compressed air in the tubing and having a pressure gauge or other alarm device connected therewith will afford a continuous test for indicating a fracture of one of the tubes or one of the welded joints.

Another object of the present invention is to provide any suitable means such as a hand pump, engine driven compressor, or wind vane motor for continually supplying air to the tubing, compressed to any predetermined pressure, so that the supply will be unlimited when used for operating the different mechanisms of the plane.

Not only does the present invention afford a testing means to increase the safety of air travel, but it provides a potential source of energy without increasing the weight of a plane as would be the case if a storage tank was used. This source of energy can be utilized in many ways, some of the uses being, to start the engine on the ground or while in flight if stalled, to operate retractible landing gear and tail supports, to operate pneumatic brakes, for pneumatic shock absorbers, for use in filling pneumatic tires, to operate a grease gun, or for use in operating any of the movable parts carried by aircraft such as the mechanisms inside the wings comprising wing slots or flaps, etc. It is also possible to fill the tubing with a suitable fire extinguishing gas such as $CO_2$, manually releasable in case of fire during flight, or automatically in the event of a crash through the action of an inertia valve.

Another advantage obtained in filling the tubular structure of an aeroplane with a fluid under pressure is that the tubes are thereby subjected to endwise tension, resulting in an increase in the compressive strength thereof.

Other objects and advantages will hereinafter appear in the following detailed description of the invention, reference being had to the accompanying drawings.

In the drawings:

Figure 1 is a skeleton view of an aeroplane embodying my invention, illustrating a retractible tail wheel or skid in connection therewith;

Figure 2 is a fragmentary view of a plane illustrating the use of the invention in connection with a retractible landing gear, also showing a pneumatic shock absorber operable by the compressed air contained in the hollow tubing of the plane;

Figure 3 is a diagrammatic cross section of the valve shown in Figure 2;

Figure 4 is a perspective view of a plane, partly broken away in section, illustrating the manner in which the tubing of a plane may be divided into a plurality of reservoirs;

Figure 5 illustrates diagrammatically one method of providing pipeline connections between the various reservoirs and the compressor; and Figure 6 diagrammatically illustrates another method of connecting the different reservoirs, a hand pump being inserted in series with the compressor.

Although the drawings illustrate specific constructions, the latter are only shown by way of illustration, it being obvious that there are numerous ways in which the present invention may be incorporated in an aircraft as well as numerous ways in which the reservoir capacity may be used.

Referring now to Figure 1, a plane, consisting of hollow steel tubing comprising the framework thereof, is generally indicated by the numeral 7. The plane briefly comprises the motor compartment 8, fuselage 9, wings 11, landing gear 12, and the empennage 13. The various sections of steel tubing 14 are welded together so as to have their interiors interconnected to form a tubular system which will act in the capacity of a reservoir for storing any desirable fluid such as air, gas, or fuel and the like. The wings 11 may comprise a plurality of ribs 15 constructed from hollow tubing welded together, the wings being provided with suitable laterally extending connecting pipes 16 which serve as a means for effecting communication between the interiors of the various ribs 15. The interiors of the plurality of ribs 15 may be connected in any suitable manner with the interiors of the tubing structure of the fuselage 9, as by means of a connection 17.

The struts of the landing gear are preferably hollow steel tubes welded to the framework of the fuselage so as to have their interiors likewise interconnected, and the same is true of the tubing comprising the vertical stabilizer fin.

With the tubes interconnected as above described, the framework of the plane becomes a reservoir, the total interior capacity of which would be sufficient to hold a relatively large volume of compressed air, thereby affording a potential source of energy capable of supplying motive power for different uses on the plane, without requiring the additional weight of a separate air storage reservoir or tank. Any suitable means such as a small air cooled compressor 18 connected with the motor 19 may be utilized for supplying compressed air to the tubes, the compressor being capable of intermittent operation by means of any suitable clutching arrangement easily operated from the cockpit by the pilot whenever desired. A pipeline 21 supplies the air from the compressor to the tubing of the fuselage. A pressure gauge 22 is suitably located on the instrument board of the plane and will at all times indicate to the pilot the pressure of compressed air contained within the tubes. The gauge may be suitably connected with the tubes 14 as by means of a pipeline 23. The compressed air stored within the tubing may very readily be maintained at a predetermined pressure, which will be indicated by the pressure gauge 22, and if a defect in the framework develops, a sharp diminution of air pressure in the system of tubing will immediately indicate a structural failure, thereby immediately warning the pilot of the unsafe condition of the aircraft. If desired, an audible alarm device may be provided in lieu of or to operate in conjunction with the visual indicating pressure gauge for giving an audible alarm.

The plane 7 is shown as being provided with a retractable tail wheel or skid 24, which is operable by means of a piston in the pneumatic cylinder 25, the piston being actuated by the compressed air contained within the tubular structure of the plane. Any form of suitable valve 26 may be provided in a pipeline supplying compressed air to either end of the cylinder 25 by means of flexible connections 27 and 28. This valve may be operated from the pilot's compartment by means of the lever 29 and rod 31 to admit air through pipe 27 to the back of the piston operating within the cylinder 25 to thereby draw the tail gear up out of the air stream and into the enclosed portion of the fuselage. When the pilot is about to make a landing, he throws the lever 29 in the reverse direction, opening pipeline 27 to atmosphere and admitting compressed air through pipeline 28 to the front of the piston, thereby forcing the tail gear 24 out of the fuselage and against a suitable stop such as the rubber bumper 32. A spring 33 has been provided for automatically operating the tail gear 24 into landing position in the event that the air pressure within the structural tubing should fail, as would occur from a break in the tubing.

Figure 2 diagrammatically illustrates a retractible landing gear, such as is used in connection with larger ships of the present day type for reducing the air resistance while the ship is in flight or in connection with amphibian aircraft. The landing gear here shown is operated by means of compressed air supplied from within the hollow steel framework of the plane. A pneumatic shock absorber 34 is secured to the laterally extending struts 35, and compressed air is supplied from within the struts 35 into the shock absorber 34 by means of a passageway 36, and the air so supplied acts upon the piston 37 secured to the supporting member 38 of the landing gear. The landing wheel 41 is carried by the strut 42, the latter being pivotally connected with member 38. The landing wheel 41 is moved from landing position to flying position by means of the pneumatic cylinder 43 comprising a piston operatively connected by a piston rod 44 to a slidable sleeve 45, the latter being guided for sliding movement along an auxiliary tube 46 for actuating the arm 47 which is pivotally connected to the sleeve at 40 and to the strut 42 at 48. To retract the landing gear from the landing position into flying position as shown in full lines in Figure 2, the valve 49, inserted in a pipe line 51 supplying compressed air from the tubing structure of the plane to the cylinder, is opened to the position illustrated in full lines in Figure 3. After the wheel 41 has been raised to the position shown in Figure 2, valve 49 may be left in this position or may be turned 45 degrees into the dotted line position of Figure 3, in which latter case the air within the cylinder 43 will be trapped thereby holding the landing gear in raised poistion. When a landing is to be made the valve 49 is turned another 45 degrees, or 90 degrees from its original wide open position, to allow the air to escape from within the cylinder 43 into the atmosphere through the restricted opening 52 of valve 49. The restricted opening 52 is merely for the purpose of preventing a sudden drop of the landing gear, thereby lessening the shock that would be occasioned thereby. In the event the air pressure should fail the landing gear will automatically drop into landing position by its own weight, and a suitable latching means 53 is employed to cooperate with the sleeve 45 to retain the landing gear in landing position. A rod or cable 54 is connected with the latching means to be operated from the cockpit for releasing sleeve 45. The same latching device is used in the normal operation of the landing gear, although cylinder 43 could be made double acting as in cylinder 25 in Figure 1. It is apparent that a similar latching means may be utilized for engaging beneath sleeve 45 when the landing gear is raised to its flying position, so that it will not be entirely necessary to depend upon the pressure on piston 43 for holding the landing gear in raised position. A rod 55, operable from the cockpit of the plane, may be arranged to open the valves for both landing wheel mechanisms simultaneously, or separate controls may be employed to operate each valve independently. It may be advantageous to operate each landing wheel separately to conserve air pressure, and moreover because an occasion may arise where the center of gravity of the plane should be shifted somewhat to one side or the other, laterally, as may be the case in a multi-motored ship when one of the wing motors goes dead.

Referring now to Figures 4, 5 and 6, the framework structure of the plane is shown as being divided into different groups, thereby forming a number of reservoirs. In Figure 4, the entire wing 56 is divided into reservoirs 57 and 58, respectively. The fuselage 59 forms a third reservoir. A number of pressure gauges 61, corresponding to the number of separate and independent reservoirs, are provided on the instrument board for observance. In this manner it is easier to ascertain precisely in which portion or section of the ship a defect has occurred, thereby only necessitating an inspection of that particular portion.

In Figure 5, the clutch controlled compressor 62 delivers compressed air to the distributing chamber 63, and from there the air passes into the various compartments or reservoirs 57, 58, and 59, through valves 64. If any of the sections 57, 58 or 59 lose air, as may be determined from the pressure gauge associated with that section, it will be an easy matter for a pilot to close the valve located in the particular pipeline leading from the distributing chamber 63 to that section losing air. In this manner the remaining sections or reservoirs may still be utilized for delivering compressed air to the various mechanisms that are operated thereby. With the arrangement shown in Figure 5, it is possible, if desired, to tap the distributing chamber 63 by means of a pipeline 65, leading the same to the air operated mechanisms. By so doing it would still be possible to operate such mechanisms directly from the compressor 62 in the event that all the reservoir sections fail by reason of leakage. Of course, it is not very likely that all of the reservoirs would fail during flight, except possibly in very extreme instances.

Figure 5 further illustrates the use of a suitable air motor or turbine 60 connected with the aeroplane motor and adapted to be used as a means for starting the latter while in flight or on the ground. The turbine derives its power from the air delivered thereto through pipe line 65, and valve 60' is interposed in the line to control the air supply to said turbine.

In Figure 6, the wing reservoirs 66 and 67, and the fuselage reservoir 68 are connected by a pipeline leading to compresser 69. With all of the valves 71 opened, the single pressure gauge 72 will be indicative to the pilot as to the condition of the tubular framework as a whole. In the event that one of the sections should leak air, the pilot will be able to eliminate that section by closing one of the valves 71, namely, the particular valve which is located in the pipeline leading to the leaky section, thereby maintaining the remaining reservoirs as the storage tanks for the compressed air supply. A hand pump 73 has been added to this system and may also be added to any of the previously described systems. When the plane is in flight, if trouble should develop with the compressor 69 so that it will be impossible to supply compressed air to the various reservoirs, the pilot may operate the hand pump 73 for maintaining the predetermined pressure in the reservoirs. The hand pump 73 is also useful when the plane is on the ground. By the use of this pump it will be unnecessary to operate the plane engine for driving the compressor 69, and in this manner the pump 73 affords a means for testing the structural framework of the plane at any time, especially in the event that the engine is being repaired or overhauled.

The present invention has extensive application to aircraft, not only as an additive improvement, but also as an important step towards increasing the safety of modern air travel. Not only does the invention afford a continuous test to detect structural defects, but it provides a means for starting a stalled engine while in flight. Furthermore, the compressed air may be used in cooperation with the carburetor for supercharging when necessary, as for enabling a large temporary increase of power to be obtained when taking off the ground, or for enabling planes not equipped with a supercharger to ascend to higher altitudes for avoiding storms than would ordinarily be possible, providing another safety measure for air travel.

The storing of a releasable fire extinguishing fluid, preferably under pressure in the tubular structure of a plane is another meritorious feature in providing further safety means. The tubular structure surrounding the gas tanks and motor compartment acting as reservoirs, may be filled with a suitable fire extinguishing fluid under pressure, and the tubes may be provided with a plurality of nozzles directed towards the tanks and motor. Any suitable means may be employed in connection with the nozzles for allowing the fluid to be released, such as, manually operated valves or inertia valves as hereinbefore referred to. Moreover, it is also possible to seal the respective nozzles with a fusible alloy that will melt at a predetermined temperature, thereby automatically releasing the fire extinguishing fluid at the spot where fire occurs. Obviously, on a forced landing, a fracture of one or more of the tubes will automatically release the fire extinguishing fluid.

This invention may be utilized in any of the numerous types or classes of aircraft. In a dirigible having its framework constructed from welded hollow steel tubing, the extra space provided for the gaseous fuel storage bags could be used as additional space for the lifting gas cells, increasing the lift without increasing the size of the ship, while the gaseous fuel for the engines may be compressed and stored in the hollow tubing frame structure. The structure may likewise be divided into different sections to form a plurality of reservoirs, one or more sections being adapted for storing compressed air as a potential source of energy for operating such mechanisms as the rudders, elevators, or for starting the engines, and for use in operating any of the movable parts in and about the ship.

Although the description is specific to the illustrations in the drawings, it is to be understood that there may be numerous departures therefrom which will still be within the field and scope of the invention, so that I do not wish to be restricted thereto, but only in so far as the appended claims are so limited.

What I claim is:

1. In an aeroplane comprising a body having a sealed hollow frame, a compressor, and a retractible tail support pivotally mounted on said frame, said compressor being adapted to supply air under pressure into said frame, and operable means comprising an air operated piston pivotally mounted on said frame and connected with the tail support for actuating the latter into said body by means of compressed air delivered thereto from the interior of said frame.

2. In an aeroplane comprising a body having a sealed hollow frame, a compressor, and a retractible landing gear, a shock absorber mounted on said frame and pivotally supporting said landing gear, said compressor being adapted to supply air under pressure into said frame, and operable means interposed between said frame and the landing gear for actuating the latter about its pivotal connection with said shock absorber by means of compressed air delivered to said operable means from the interior of said frame, and said shock absorber being adapted to receive compressed air from within said frame for the effective operation thereof as a shock absorbing means for said landing gear.

3. In an aeroplane comprising a body having a sealed hollow frame, a compressor, and a retractible landing gear pivotally carried by said frame, said compressor being adapted to supply air under pressure into said frame, and operable means interposed between said frame and the landing gear for rotating the latter into the body by means of compressed air delivered to said operable means from the interior of said frame, and means for controlling the delivery of said air.

4. In an aeroplane comprising a fuselage and wings having a hollow framework, said framework being divided into a plurality of independently sealed sections, a compressor for supplying air to a predetermined pressure into said plurality of sections, and means connected with each of said sections to indicate a sudden drop in pressure due to a defect in the framework comprising one of the sections.

5. In an aeroplane comprising a fuselage and wings having a hollow framework, said framework being divided into a plurality of independently sealed sections, a compressor for supplying air to a predetermined pressure into said plurality of sections, means connected with each of said sections to indicate a sudden drop in pressure due to a defect in the framework comprising one of said sections, and means for connecting said plurality of sections whereby said defective section may be disconnected from the remaining sections.

RUSSELL G. JONES.